United States Patent
Eyre et al.

(10) Patent No.: US 6,940,959 B1
(45) Date of Patent: Sep. 6, 2005

(54) REMOTE BROADCAST OF CALL ANNOUNCE AND CALL SCREENING INFORMATION

(75) Inventors: Alan D. Eyre, Calgary (CA); Brian Buckler, Calgary (CA); Jim B. Paarsmarkt, Calgary (CA); Jerry Freestone, Calgary (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/522,743

(22) Filed: Mar. 10, 2000

(51) Int. Cl.[7] .................................... H04M 1/64
(52) U.S. Cl. .................. 379/142.06; 379/88.21
(58) Field of Search ................... 379/67.1, 88.16, 379/88.19, 88.2, 88.21, 88.22, 88.23, 88.24, 379/93.01, 142.01, 142.06, 142.08, 142.12, 379/201.01, 373.01, 373.02, 373.05, 142.04, 379/142.07; 455/415

(56) References Cited

U.S. PATENT DOCUMENTS

| | | | |
|---|---|---|---|
| 4,941,203 A * | 7/1990 | Patsiokas et al. | 455/517 |
| 5,388,150 A * | 2/1995 | Schneyer et al. | 379/88.19 |
| 5,432,844 A * | 7/1995 | Core et al. | 379/88.23 |
| 5,604,791 A * | 2/1997 | Lee | 379/88.21 |
| 5,623,537 A * | 4/1997 | Ensor et al. | 379/88.2 |
| 5,905,786 A * | 5/1999 | Hoopes | 379/142.12 |
| 5,978,451 A * | 11/1999 | Swan et al. | 379/88.24 |
| 6,178,230 B1 * | 1/2001 | Borland | 379/67.1 |
| 6,263,071 B1 * | 7/2001 | Swan et al. | 379/372 |
| 6,359,970 B1 * | 3/2002 | Burgess | 379/67.1 |
| 6,373,925 B1 * | 4/2002 | Guercio et al. | 379/82 |
| 6,385,303 B1 * | 5/2002 | Peterson et al. | 379/67.1 |
| 6,389,125 B1 * | 5/2002 | Ubowski | 379/142.12 |
| 6,597,766 B1 * | 7/2003 | Kawashima | 379/88.23 |

* cited by examiner

*Primary Examiner*—Scott L. Weaver
(74) *Attorney, Agent, or Firm*—Mintz Levin Cohn Ferris Glovsky & Popeo, P.C.

(57) ABSTRACT

A local CPE broadcasts incoming call information to at least one remote CPE. Before or after at least one ring tone is received, the local CPE is taken off-hook. An incoming voice message is received, and the incoming voice message is broadcast over a communications network to the remote CPE. Alternatively, incoming caller data is received, a corresponding voice message is determined as a function of at least a portion of the incoming caller data, and the voice message is broadcast over a communications network to the remote CPE. As a further alternative, the caller data is broadcast over the communications network, and the corresponding voice message is determined by the remote CPE. As yet another alternative, incoming call information is announced using on-hook customer premises equipment (CPE). An indication of an incoming CPE alerting signal (CAS) tone is received, a frequency shift keying (FSK) signal is detected as a result of receiving the indication. A corresponding voice message is determined as a function of at least a portion of the FSK signal, and the voice message is announced.

41 Claims, 7 Drawing Sheets

REMOTE BROADCAST OF CALL ANNOUNCE AND CALL SCREENING INFORMATION

BACKGROUND OF THE INVENTION

The present invention is directed to customer premises equipment (CPE) and, more particularly, to local or home networks of CPE.

Call announce and call screening are services provided by local telephone companies as part of the Call Screening, Monitoring and Intercept (CSMI) service. The services provide customers with the identity of the source of an incoming call or an incoming second call waiting (SCW) call. Before or after the first ring, typically, the central office (CO) sends a message to the customer's telephone set or CPE set that instructs the set to go off-hook and activate its speaker path so that the central office can announce the name or telephone number of the person making the incoming call. After the announcement is completed, the central office sends another message to the telephone or CPE instructing the set to go back on-hook so that the customer may answer the call, if the customer desires.

Alternatively, the call announce function is carried out by a customer's telephone answering device (TAD), digital telephone answering device (DTAD) or other CPE. The central office (CO) or voice over Internet protocol (VoIP) server sends calling line identification (CLID) data or second call waiting identification (SCWID) data to the TAD, DTAD or CPE. The customer's device parses the number field of the data, accesses a list of pre-recorded number vocalizations to select those corresponding to the numbers in the number field as well as, possibly, their position in the number field, and then delivers the sequence of number vocalizations to the device's speaker which announces the calling number. The device may also, or instead, match part or all of the CLID data to one or more records of voice tags stored in a database and then deliver the corresponding voice tags to the device's speaker. After the announcement is completed, the customer may answer the call, if desired.

Call screening may also be provided by the customer's TAD, DTAD or other CPE. When an incoming telephone call is not answered within a preselected interval or preselected number of rings, the TAD, DTAD or other CPE takes the line off-hook and then sends an outgoing voice message over the telephone line to the caller. When the caller replies to the outgoing voice message with an incoming voice message, the incoming voice message is recorded and is also delivered to the device's speaker. The customer may listen to the incoming message and may answer the call, if desired, while the incoming voice message is being announced.

The call announce and call screening features permit a customer to decide beforehand whether to answer the call, and thus the customer need not waste time responding to an unwanted call or caller. Further, the features allow a customer to prioritize between two incoming calls when a second call waiting call is received, even when both calls are desired, so that the customer can decide whether or not to interrupt a first call to respond to a second incoming call. Moreover, the information provided by the call announce or call screening features may be all that is needed by the customer so that the customer need not interrupt other activities to actually answer the call.

The incoming message however, can usually be heard clearly only while the customer is in the room where the telephone set, TAD, DTAD or other CPE is located and/or in close proximity thereto. If the customer is in another room, is not near the device or is otherwise occupied and unable to move to a location where the message can be heard more clearly, the customer may miss the message or not hear the message until the customer subsequently replays it.

It is therefore desirable that the call announce and call screening messages be heard on other devices that are connected to the customer's telephone set, TAD, DTAD or other CPE.

SUMMARY OF THE INVENTION

The present invention provides for the broadcast of call announce identification information, CLID and SCWID data and/or incoming voice messages by the CPE that receives the message to other CPE that are networked or otherwise connected to it. The invention also enables an on-hook CPE to detect and announce SCWID data or call announce identification information while another CPE device is off-hook.

In accordance with an aspect of the invention, a local CPE broadcasts incoming call information to at least one remote CPE. The local CPE is taken off-hook, an incoming voice message is received, and the incoming voice message is broadcast over a communications network to the remote CPE.

According to another aspect of the invention, a local CPE broadcasts incoming call information to at least one remote CPE. Incoming caller data is received. A corresponding voice message is determined as a function of at least a portion of the incoming caller data, and the voice message is broadcast over a communications network to the remote CPE.

According to a further aspect of the invention, incoming call information is broadcast from a local CPE to at least one remote CPE. The local CPE receives incoming caller data and broadcasts the voice message over a communications network to the remote CPE. The remote CPE determines a corresponding voice message as a function of at least a portion of the incoming caller data.

According to a still further aspect of the invention, incoming call information is announced using on-hook customer premises equipment (CPE). An indication of an incoming CPE alerting signal (CAS) tone is received, a frequency shift keying (FSK) signal is detected as a result of receiving the indication. A corresponding voice message is determined as a function of at least a portion of the FSK signal, and the voice message is announced.

Other features and advantages of the present invention will become apparent from the following detailed description of the invention with reference to the accompanying drawings.

BRIEF DESCRIPTION OF THE DRAWINGS

The invention will now be described in greater detail in the following detailed description with reference to the drawings in which.

DETAILED DESCRIPTION OF THE INVENTION

Figure 1:
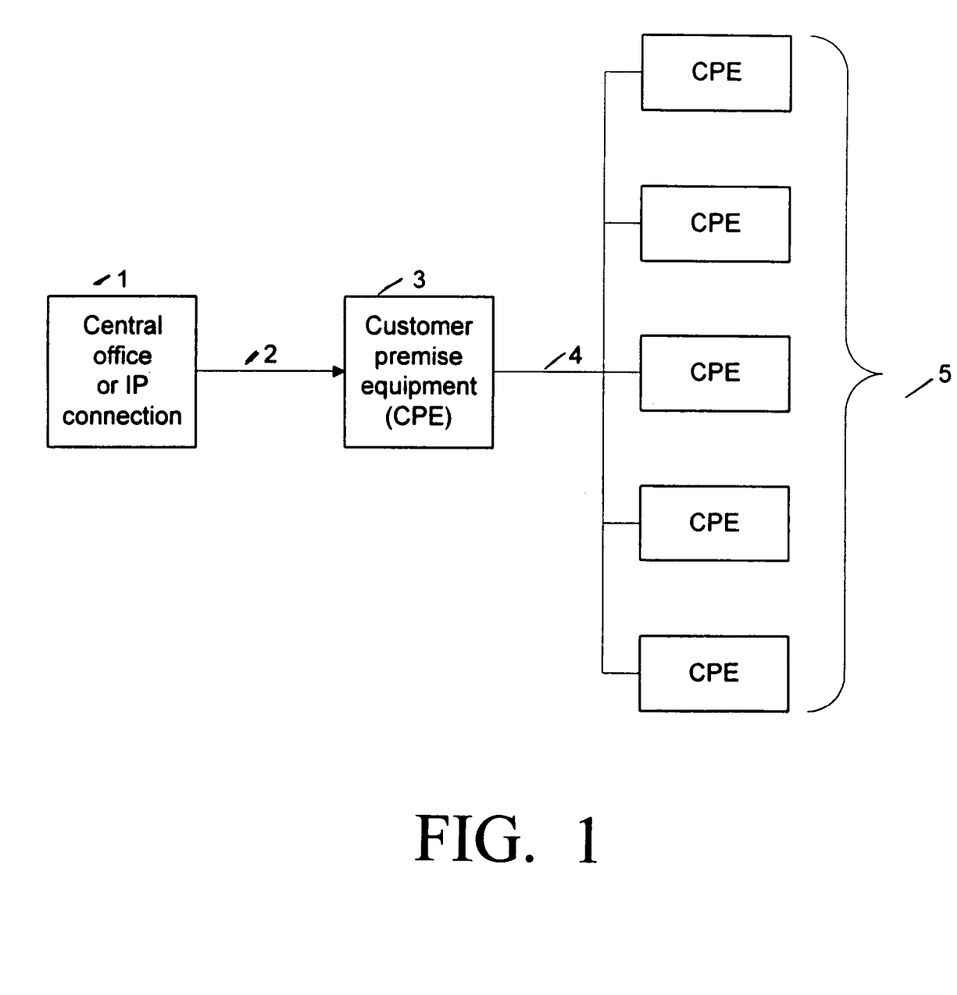
FIG. 1 is a block diagram showing an arrangement of networked CPE in accordance with an embodiment of the invention.

FIG. 1 shows an arrangement for the receipt and broadcast of call announce identification information, CLID and SCWID data, incoming voice messages, and/or other information, according to an embodiment of the invention. A local CPE device 3 is connected to a CO switch, ISP server or VoIP server 1, or the like, via a voice or data network 2, such as the telephone network or the Internet. The local CPE 3, which may be a telephone set, a TAD, a DTAD, voice mail device, or the like, is also connected to one or more remote CPE 5 via a communications network 4. The network may be VentureNet, Ethernet, a "blue tooth" network, a X.10 network, a personal computer (PC) network, a wireless network or any other networking environment of sufficient bandwidth. The remote CPE 5 may be located in the same room or in rooms adjacent to the location of the local CPE 3, in the same building as the local CPE 3, or at distant locations.

As an example, the local CPE 3 receives incoming voice signals, such as call announce identification information or incoming voice messages, from the CO switch or VoIP server 1 and broadcasts them to the remote CPE units 5 over the network 4. The broadcast may be global, namely to all of the remote CPE units, or may be only to selected remote CPE units. Also, the local CPE 3 may set up and broadcast over a connection to one or more of the remote CPE 5 or may send connectionless data to the units. The remote CPE 5 may then deliver the incoming voice signals to their respective speakers or to other stand-alone speakers so that the message may be heard by the customer, or the remote CPE may store the message for subsequent playback.

As another example, the local CPE 3 receives incoming caller data, such as CLID or SCWID data, from the CO switch, ISP server or VoIP server 1. The data may be in the form of frequency shift keying (FSK) signals, such as when transmitted by the CO switch, or may be in the form of Multipurpose Internet Mail Extension (MIME) format, Hypertext Markup Language (HTML) format, Java format, Javascript and/or Active X format, etc., such as when transmitted by the ISP server or VoIP server. The local CPE 3 then accesses a database or the like, which may be stored in the local CPE 3 or in another device, matches the data to information stored in the database, extracts the associated voice tags, and broadcasts the voice tags over the network 4 to some or all of the remote CPE devices 5. The local CPE device 3 may set up a connection and broadcast to one or more of the CPE units 5 or may send connectionless data to the units. The remote CPE units 5 may then deliver the voice tags to their respective speakers to be heard by the customer or may store them for subsequent playback.

Alternatively, the local CPE 3 receives the CLID or SCWID data and parses the number field of the data. The local CPE then accesses a list of pre-recorded number vocalizations, which may be stored in the local CPE 3 or in another device, selects those corresponding to the numbers present in the number field of CLID or SCWID data as well as, possibly, corresponding to their position in the number field, and then broadcasts the vocalizations over the network 4 to some or all of the remote CPE devices 5 for delivery to their respective speakers or for storage and subsequent playback.

As a further alternative, the local CPE 3 receives the CLID or SCWID data and broadcasts the data over the network 4 to some or all of the remote CPE devices 5. The CPE devices 5 then carry out the operations of matching the data to information stored in a database and extracting the associated voice tags and/or the operations of parsing the number field of the data and selecting from pre-recorded number vocalizations, as described above, and then deliver the voice tags or vocalizations to their speakers or store the voice tags or vocalizations.

Figure 2:
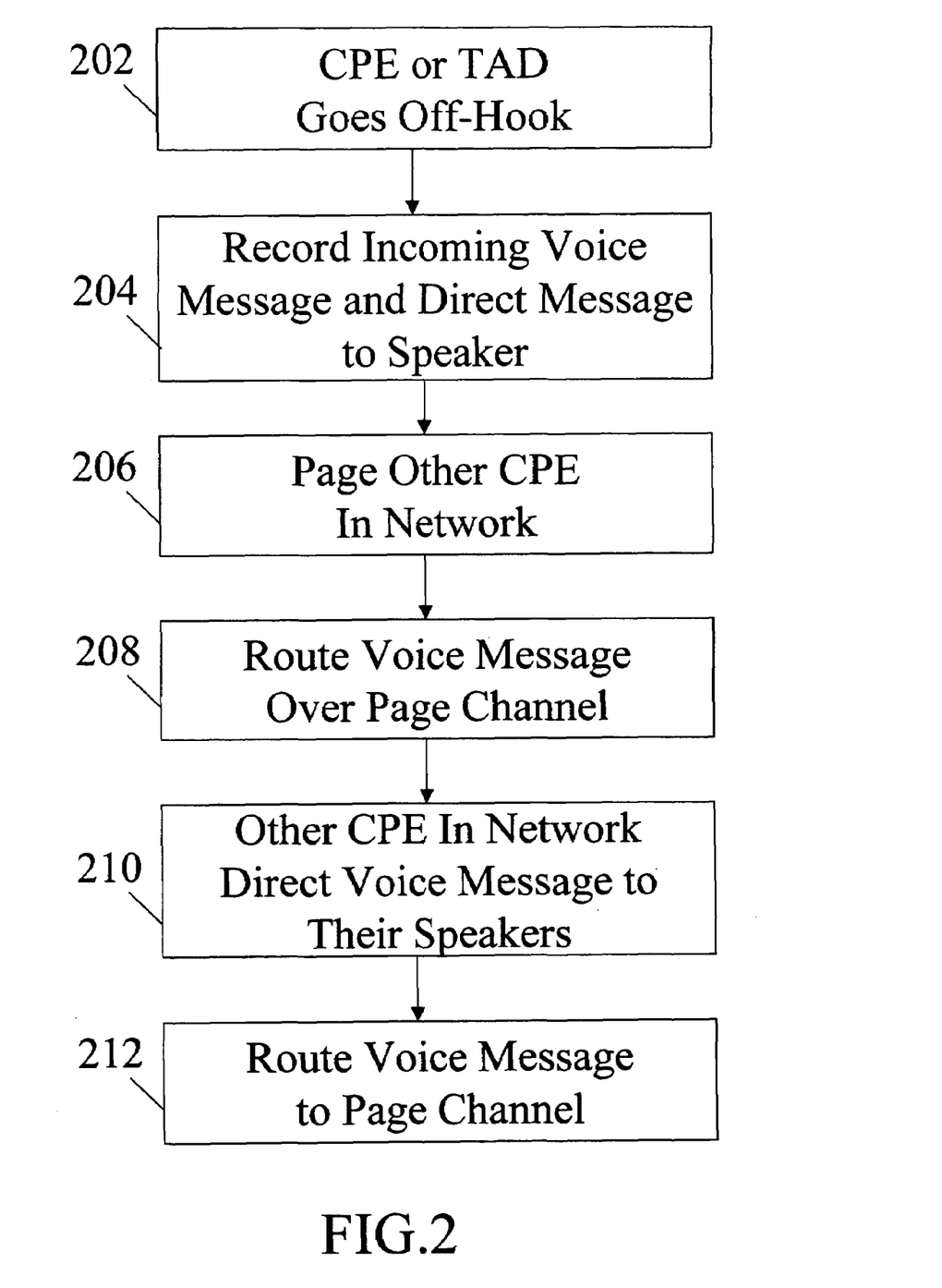
FIG. 2 is a flow chart illustrating a sequence of operations for broadcast of an incoming call screening stream or a voice message in accordance with the invention.

An example of the broadcast of call announce identification information or incoming voice messages is now described in greater detail with reference to the flow chart shown in FIG. 2. First, the CO switch, VoIP server or ISP server rings the customer's telephone or CPE or sends another indication thereto, and a TAD, DTAD, voice mail unit or remote CPE device goes off-hook, as step 202 shows, and sends an outgoing message over the telephone line. The caller responds with an incoming voice message that is received by the device. The incoming voice message is recorded by the device and is also directed to the device's speaker or hands-free speaker or to another stand-alone speaker, as shown at step 204.

The TAD, DTAD, voice mail unit or local CPE device then pages some or all of the remote CPE in the network, which may be any of the networking environments described above, as step 206 shows, and routes the voice message over the paging channel to the other selected CPE, as shown at step 208. The remote CPE deliver the voice message to their respective speakers or to other connected speakers, as step 210 shows, so that the incoming voice message is broadcast at locations remote from the local CPE that received the message from the CO switch. The customer, upon hearing the message at one of the remote locations, may respond to the incoming call or may permit the local TAD, DTAD, or voice mail device, etc. to continue to record the incoming message. The local CPE device then disconnects from the paging channel, as shown at step 212.

Alternatively, before or after the CO switch or VoIP or ISP server rings the customer's telephone or local CPE, or instead of ringing the telephone or CPE, the switch or server sends a message, such as via FSK signals, MIME format messages, HTML format messages, Java format messages, Javascript messages, Active X messages, or the like, that instructs the local TAD, DTAD or remote CPE to go off-hook, as shown at step 202, and activate its speaker. The CO switch then sends a voice announcement that includes the name and/or telephone number of the caller. The voice announcement is recorded by the local TAD, DTAD or CPE and is also directed to the local device's speaker or hands-free speaker or to another stand-alone speaker, as step 204 shows. The remaining steps of FIG. 2 are then carried as described above.

Figure 3:
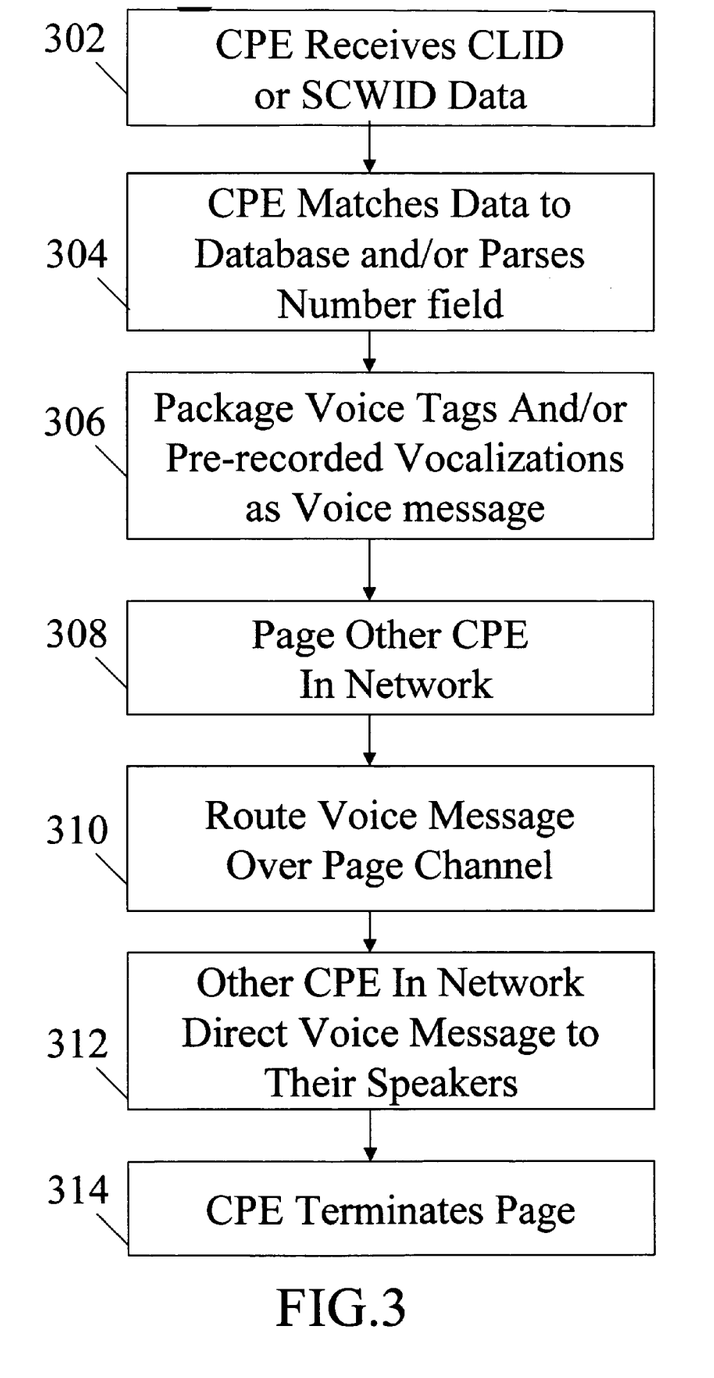
FIG. 3 is a flow chart illustrating a sequence of operations for broadcast of an incoming calling line identification data or second call waiting identification data in accordance with the invention.

FIG. 3 is flow chart illustrating an example of the broadcast of CLID and SCWID data. Before, after or instead of the first ring, typically, the CO switch or the VoIP or ISP server sends a message to the local CPE that contains the CLID or SCWID data, as step 302 shows. The message may be in the form of FSK signals, which may be preceded by a CPE alerting signal (CAS), or may be in another format as described above. The local CPE matches the data to information stored in a database and extracts the associated voice tags, as shown at step 304. Alternatively or additionally, the local CPE parses the number field of the CLID or SCWID data and selects corresponding vocalizations from a stored, pre-recorded list. The local CPE then packages the voice tags and/or the vocalizations for broadcast as a voice message, as step 306 shows, and then broadcasts the voice message to the remote CPE in a manner similar to that described above regarding FIG. 2, as steps 308, 310, 312 and 314 show.

Figure 4:
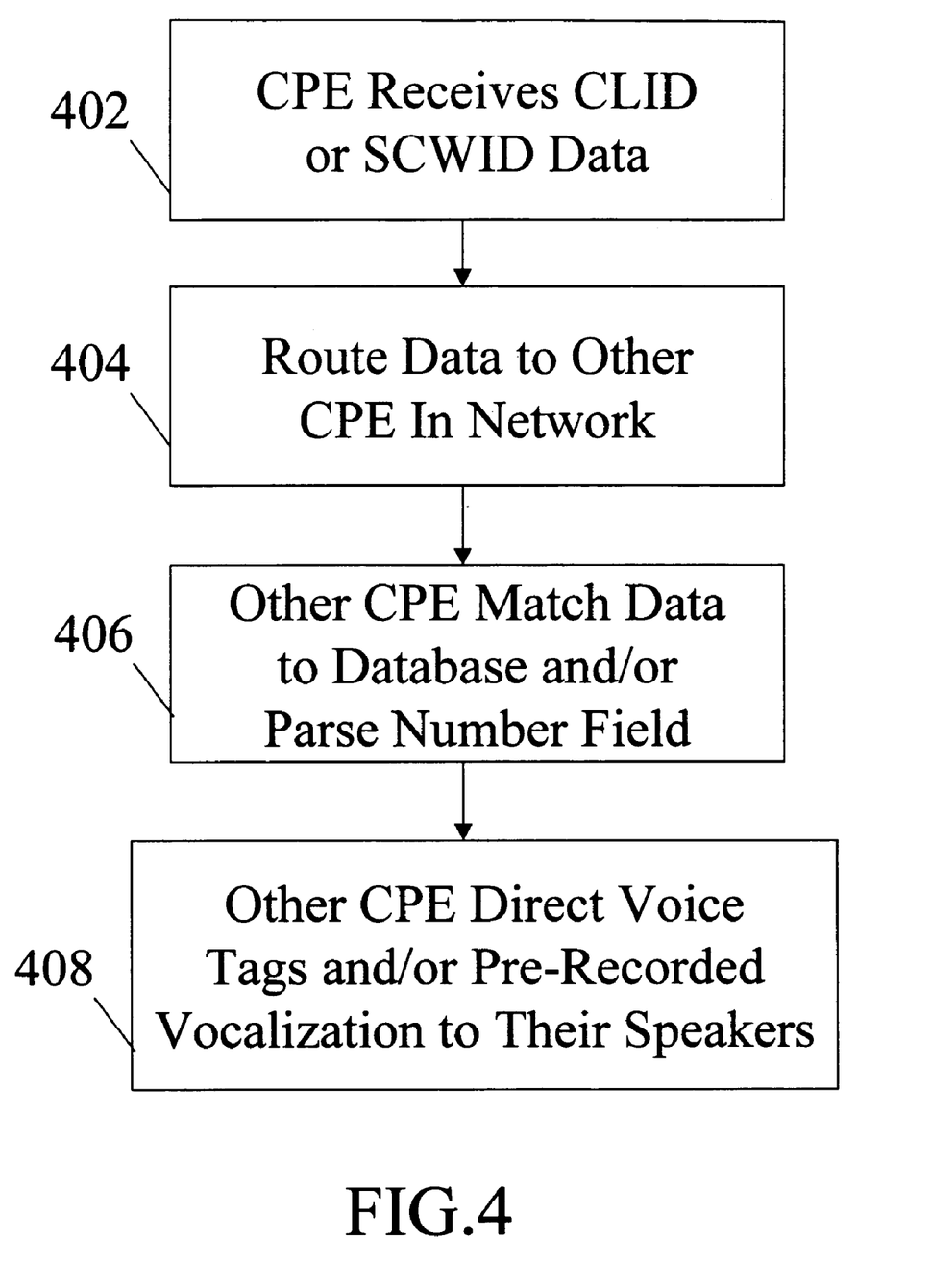
FIG. 4 is a flow chart illustrating another sequence of operations for broadcast of an incoming calling line identification data or second call waiting identification data in accordance with the invention.

FIG. 4 illustrates the flow of another example in which the CLID and SCWID data are broadcast by the local CPE in the form of data, rather than as a voice message, and the database search and/or parsing operations are then carried out by the remote CPE. After the local CPE receives the CLID data or SCWID data in the manner described above, as shown at step 402, the local CPE broadcasts the CLID or SCWID data over a network to one or more remote CPE, as step 404 shows. The remote CPE that receive the CLID or SCWID data then search the database and extract voice tags and/or parse the number field and select the corresponding pre-recorded vocalizations in the manner described above, as shown at step 406. The remote CPE direct the voice tags and/or the vocalizations to their respective speaker devices, as step 408 shows.

It is also possible that an on-hook remote CPE receive call announce identification information and/or CLID and SCWID data by detecting CAS tones and FSK signals, such as while the local CPE is off-hook. As an example, a new call waiting caller ID (type 2) standard, known as a Multiple Extension Interworking (MEI) standard, is under development by the Telephone Industries Association (TIA) and requires all CPE to maintain a synchronous call log whether the CPE is on-hook or off-hook. To maintain such a call log, the MEI CPE must detect the FSK signals that follows the CAS tone.

Figure 5:
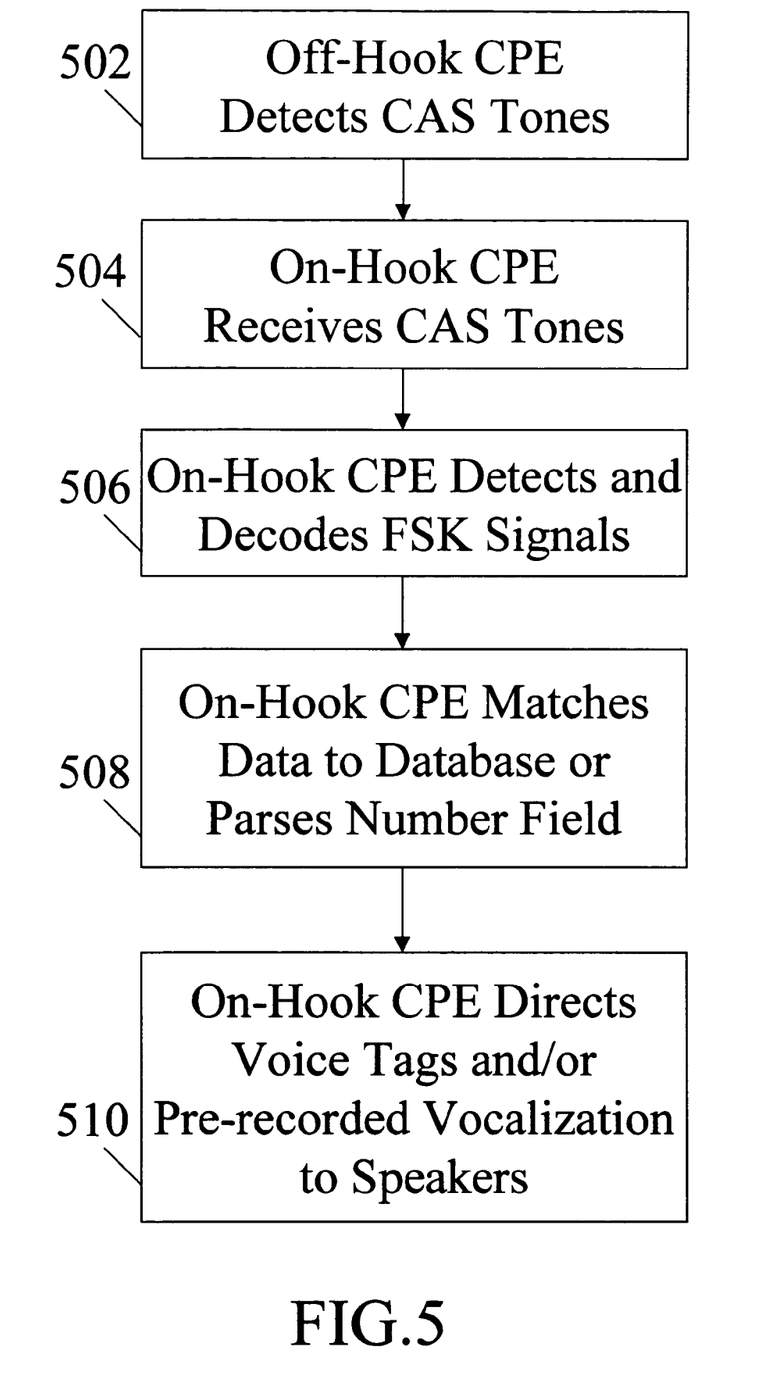
FIG. 5 is a flow chart illustrating a sequence of operations for an on-hook CPE unit announcing incoming voice information while another CPE unit is off-hook in accordance with the invention.

FIG. 5 is flow chart that illustrates an example of an on-hook CPE that receives CLID and SCWID data while another CPE is off-hook. Before, after, or instead of the first ring, typically, the CO switch or VoIP server sends CAS tones to the off-hook local CPE, as step 502 shows. At the same time, the on-hook CPE also receives the CAS tones, as shown at step 504, which alerts the on-hook CPE that the CO switch or VoIP server will shortly send a FSK signal. Alternatively, the on-hook CPE receives an indication that the off-hook CPE has received the CAS tones, such as by the off-hook CPE going on hook for a preset interval, but does not directly detect the CAS tones. An example of such an arrangement is described in U.S. application Ser. No. 09/455,760, titled "On-hook Customer Alerting Signal Detection by Customer Premises Equipment" to J. Freestone, et al., which is incorporated herein by reference.

The on-hook CPE then detects and decodes the FSK signals, as step 506 shows, and extracts the CLID or SCWID data. The on-hook CPE then searches a database and extracts voice tags and/or parses the number field and selects the corresponding pre-recorded vocalizations in the manner described above, as shown at step 508. The on-hook CPE thereafter directs the voice tags and/or the vocalizations to its respective speaker devices, as step 510 shows.

As a further alternative, the on-hook CPE receives the CAS tones and then detects and decodes the FSK signals, as described above and shown at steps 504 and 506. However, the FSK signal instructs the on-hook CPE to go off-hook and turn on its speaker. The CO switch or the VoIP server then sends a call announce identification voice message which the CPE directs to its speaker. The CPE then goes back on-hook.

Figure 6:
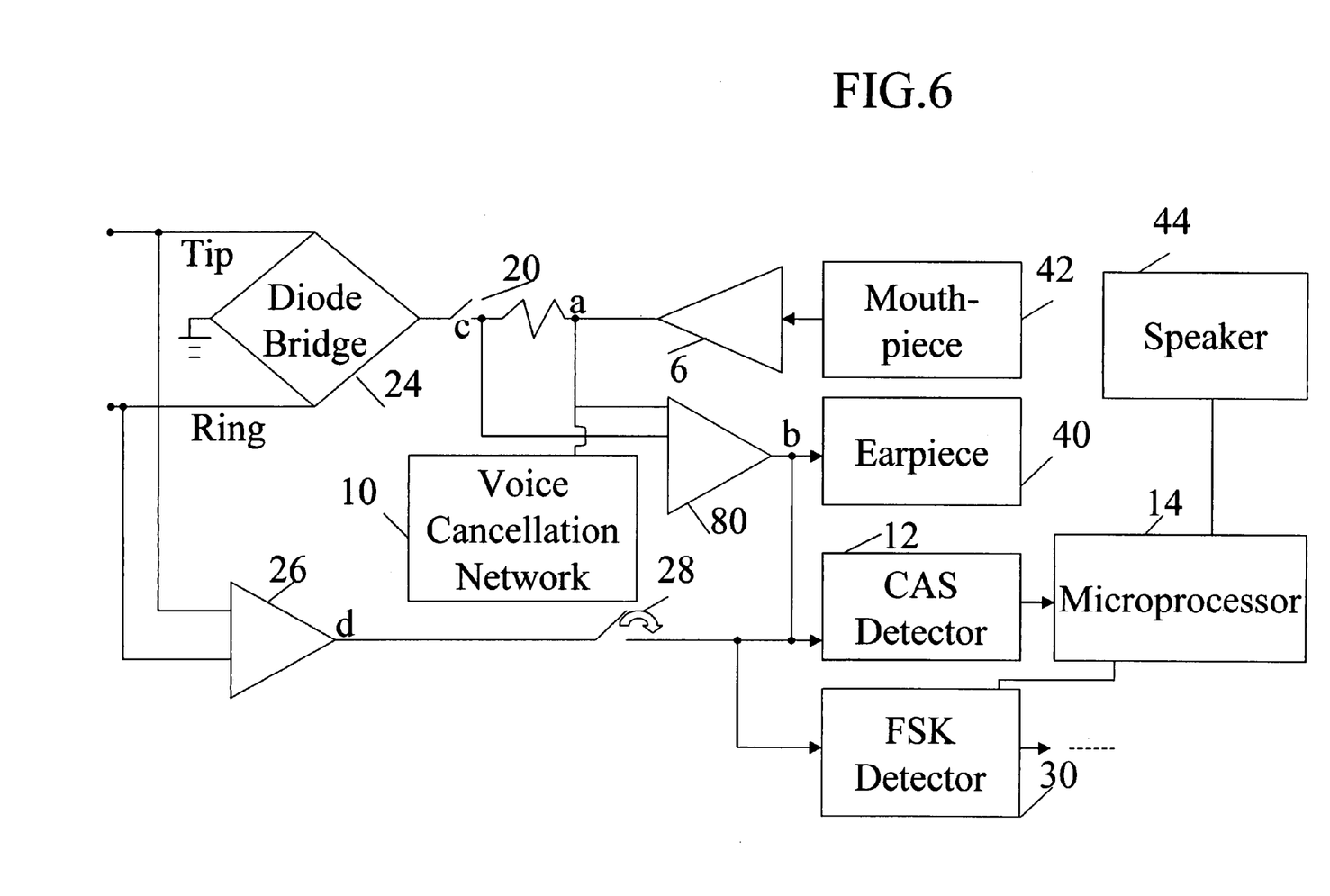
FIG. 6 is a block diagram showing an arrangement for an on-hook CPE unit announcing incoming voice information while another CPE unit is off-hook in accordance with an embodiment of the invention.
Figure 7:
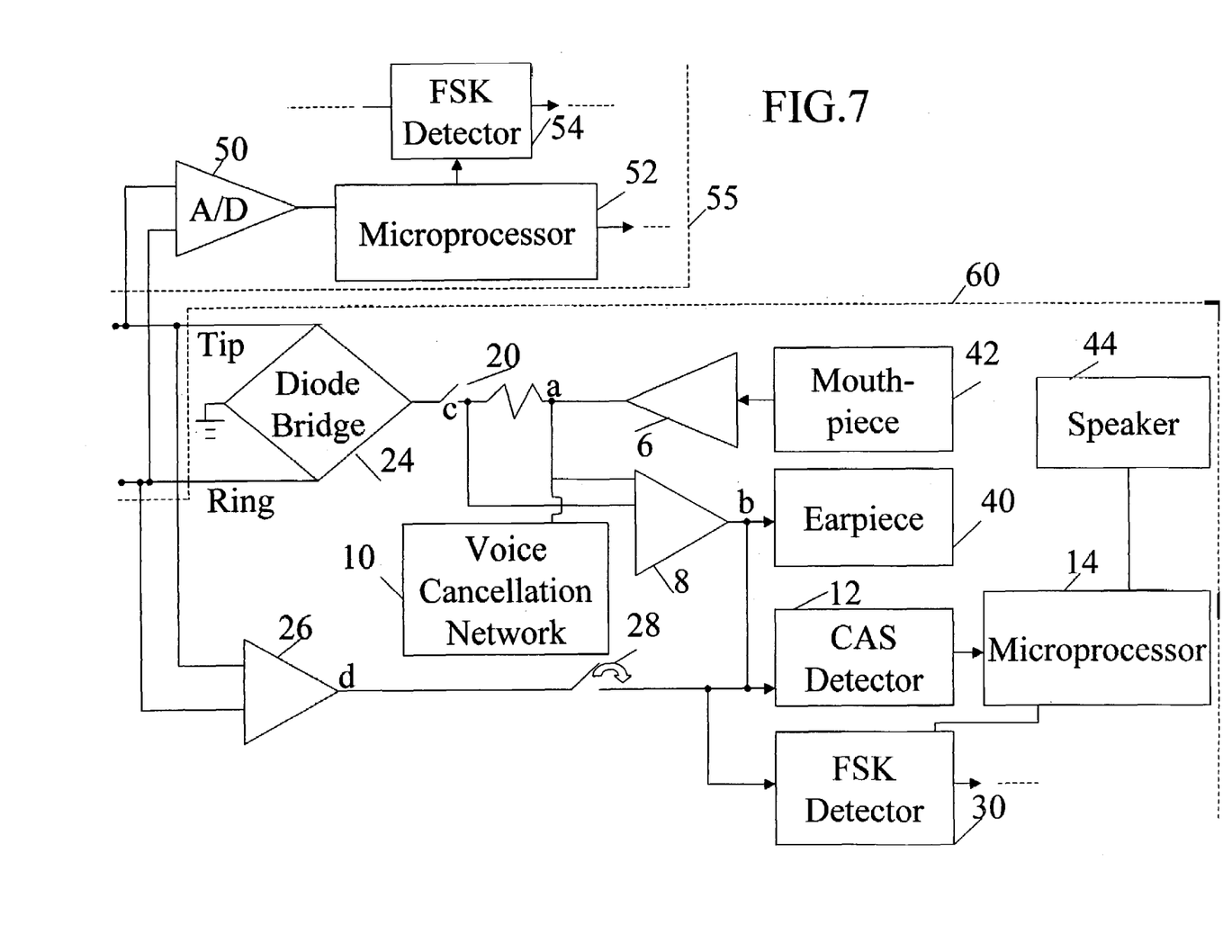
FIG. 7 is a block diagram showing an arrangement for an on-hook CPE unit announcing incoming voice information while another CPE unit is off-hook in accordance with an embodiment of the invention.

FIGS. 6 and 7 show an example of arrangement in which an on-hook telephone or CPE detects a CAS tone using the CAS detector of an off-hook telephone or CPE that is connected in parallel with the on-hook telephone or CPE. The off-hook CPE detects a CAS tone and then goes on-hook for a preset interval, typically 5–8 ms. An on-hook pulse is detected by the on-hook CPE and is used as an indication that an FSK burst will arrive shortly. The arrangement is described in greater detail in the incorporated U.S. application Ser. No. 09/455,760.

FIG. 6 shows a CPE or a telephone which is connected to the tip and ring of a telephone line. A mouthpiece receiver 42 receives and delivers voice tones to an amplifier 6. The voice tones are then transmitted over the telephone network via a closed hookswitch 20 and a diode bridge 24. Hookswitch 20 is closed when the CPE or telephone is off-hook. Incoming voice signals are delivered via the diode bridge 24 and the hookswitch 20 to a receiver amplifier 8 and then via an earpiece 40 to the listener.

A voice cancellation network 10 compares the amplitude of the outgoing voice signal at location "a" to the amplitude at location "c" and attempts to equalize the amplitudes at the two locations. When the two amplitudes are substantially equal, virtually none of the outgoing voice signals are transmitted to location "b" back to the earpiece 40 so that a caller cannot hear their own voice while speaking on the telephone.

A CAS tone detector 12 detects the CAS tones at location "b". The CAS tones are transmitted over the tip and ring through diode bridge 24 and the closed hookswitch 20 to the amplifier 80 to location "b". When the telephone or CPE is on-hook, the switch 20 is open and the switch 28 is closed so that the CAS tone detector 12 receives the CAS tones from the tip and ring via a hybrid bypass comprised of an amplifier 26 and the closed switch 28.

FIG. 7 illustrates an off-hook telephone or CPE 60 and an on-hook telephone or CPE 55 that are connected in parallel with the tip and ring. The off-hook set 60 includes the elements shown in the device of FIG. 6, and the on-hook set 55 likewise includes the element of the device shown in FIG. 6. However, the telephone or CPE 55 is modified to include a monitor, such as an analog-to-digital convertor 50, which monitors the tip and ring of the telephone line and provides signals to a processor 52, which may be a microprocessor, an application specific integrated circuit (ASIC), a programmable logic array (PLA), or a reduced instruction set chip (RISC), etc. whose instructions are also accordingly modified.

When the CAS tone detector 12 of the off-hook set 60 detects a CAS tone, the detector 12 delivers a corresponding signal to the microprocessor 14, and the microprocessor 14 instructs hookswitch 20 to go back on-hook for a predetermined interval. Typically, the hookswitch goes back on-hook for at least the duration of a flash signal or, for example, for 8–35 ms. The off-hook set 60 then checks for the telephone line to enter a "line idle" or a "high" state to verify that there are no other parallel connected telephones or CPE concurrently off-hook. Alternatively, the processor 14 mutes or decreases the volume of the transmitted voice tones to detect other parallel connected telephones or CPE. The processor 14 of the set 60 then goes back off-hook, re-seizes the telephone line and sends an acknowledgment ACK over the telephone line to instruct the local telephone switch to transmit the FSK signals. The processor also enables the FSK detector 30 to detect the FSK signals.

The analog-to-digital convertor 50 of the on-hook set 55 monitors the tip and ring for the pulse generated when the set 60 goes on-hook or for when the set mutes or decreases the volume of the transceiver, and then the monitor signals the processor 52 that set 60 is on-hook, muted or has reduced its volume. The analog-to-digital convertor 50 subsequently signals the processor 52 when the set 60 is again off-hook, and the processor 52 thus calculates the duration of the flash signal or on-hook interval to determine whether the set 60 has detected a CAS tone. The processor 52 then instructs the FSK detector 54 to detect the FSK signals, processes the FSK signals, turns on its speaker, and delivers the voice tags and/or pre-recorded vocalizations to the speaker, as described above.

Although the present invention has been described in relation to particular embodiments thereof, many other variations and modifications and other uses may become apparent to those skilled in the art. It is preferred, therefore, that the present invention be limited not by this specific disclosure herein, but only by the appended claims.

What is claimed is:

1. A method of broadcasting incoming call information from a local customer premises equipment ("CPE") to at least one remote CPE, said method comprising:
   receiving incoming call information including a voice message at said local CPE; and broadcasting, using said local CPE, a derived call information, which is derived from said received incoming call information and which includes said incoming call information, over a communications network to said at least one remote CPE.

2. The method according to claim 1 further comprising taking said local CPE off-hook prior to receiving said voice message.

3. The method according to claim 1 wherein said local CPE is at least one of a telephone set, a telephone answering device (TAD), digital telephone answering device (DTAD), and a voice mail device.

4. The method according to claim 2 wherein said local CPE receives at least one ring tone from at least one of a central office (CO) switch, a voice over Internet protocol (VoIP) server, and an Internet service provider (ISP) server prior to taking said local CPE off-hook.

5. The method according to claim 1 wherein said broadcasting step includes transmitting said voice message over a paging channel.

6. The method according to claim 1 wherein said network includes at least one of a VentureNet, a Ethernet, a "blue tooth" network, a X.10 network, a personal computer (PC) network, and a wireless network.

7. The method according to claim 1 further comprising said at least one remote CPE delivering said voice message to a speaker device.

8. The method according to claim 1 further comprising said local CPE delivering said voice message to a speaker.

9. The method according to claim 1 further comprising the step of said at least one remote CPE storing said voice message.

10. The method according to claim 1 wherein said voice message is a call announce identification message.

11. The method according to claim 10 wherein said call announce identification message is generated by at least one of a central office (CO) switch, a voice over Internet protocol (VoIP) server, and an Internet service provider (ISP) server.

12. The method according to claim 2 further comprising the step of receiving a data message instructing said local CPE to go off-hook prior to said local CPE going off-hook.

13. A method of broadcasting incoming call information from a local customer premises equipment ("CPE") to at least one remote CPE, said method comprising:
   receiving incoming call information including caller data at said local CPE, wherein said caller data is received as at least one frequency shift keying ("FSK") signal;
   broadcasting, using said local CPE, a derived call information, which is derived from said received incoming call information and which includes said incoming call information, over a communications network to said at least one remote CPE; and
   determining, at said remote CPE, a corresponding voice message as a function of at least a portion of said caller data, wherein said determining includes parsing a number field derived from said at least one FSK signal, and selecting sounds corresponding to said parsed number field.

14. A method of broadcasting incoming call information from a local customer premises equipment ("CPE") to at least one remote CPE, said method comprising:
   receiving incoming call information including caller data at said local CPE, wherein said caller data is received as at least one frequency shift keying ("FSK") signal;
   broadcasting, using said local CPE, a derived call information, which is derived from said received incoming call information and which includes said incoming call information, over a communications network to said at least one remote CPE; and
   determining, at said remote CPE, a corresponding voice message as a function of at least a portion of said caller data, wherein said determining includes matching data derived from said at least one FSK signal to associated voice tags.

15. The method according to claim 14 further comprising said at least one remote CPE delivering said voice tag to a speaker device.

16. The method according to claim 14 further comprising said at least one remote CPE storing said voice tag.

17. A method of broadcasting incoming call information from a local customer premises equipment ("CPE") to at least one remote CPE, said method comprising:
   receiving incoming call information including caller data at said local CPE; and
   broadcasting, using said local CPE, a derived call information, which is derived from said received incoming call information and which includes said incoming call information, over a communications network to said at least one remote CPE, wherein said network includes at least one of a VentureNet, a Ethernet, a "blue tooth" network, a X.10 network, a personal computer (PC) network, and a wireless network.

18. A method of broadcasting incoming call information from a local customer premises equipment ("CPE") to at least one remote CPE, said method comprising:
   receiving incoming call information including caller data at said local CPE;
   determining, at said local CPE and as a function of at least a portion of said incoming call information, a derived call information including said incoming calling information and comprising a voice message, wherein said determining includes parsing a number field derived from at least one frequency shift keying ("FSK") signal, and selecting sounds corresponding to said parsed number field; and broadcasting, using said local CPE, said derived call information over a communications network to said at least one remote CPE.

19. The method according to claim 18 further comprising said at least one remote CPE delivering said sounds corresponding to said parsed number field to a speaker.

20. The method according to claim 18 further comprising said at least one remote CPE storing said sounds corresponding to said parsed number field.

21. A method of broadcasting incoming call information from a local customer premises equipment ("CPE") to at least one remote CPE, said method comprising:

receiving incoming call information including caller data at said local CPE;

determining, at said local CPE and as a function of at least a portion of said incoming call information, a derived call information including said incoming calling information and comprising a voice message; and broadcasting, using said local CPE, a derived call information, which is derived from said received incoming call information and which includes said incoming call information, over a communications network to said at least one remote CPE, wherein said network includes at least one of a VentureNet, a Ethernet, a "blue tooth" network, a X.10 network, a personal computer (PC) network, and a wireless network.

22. An apparatus for broadcasting incoming call information from a local customer premises equipment ("CPE") to at least one remote CPE, said apparatus comprising:

means for receiving incoming call information including a voice message at said local CPE;

means for deriving call information from said received incoming call information, wherein said derived call information includes said incoming call information, and means for broadcasting said derived call information over a communications network to said at least one remote CPE.

23. The apparatus according to claim 22 further comprising means for taking said local CPE off-hook prior to receiving said voice message.

24. The apparatus according to claim 22 wherein said local CPE is at least one of a telephone set, a telephone answering device (TAD), digital telephone answering device (DTAD), and a voice mail device.

25. The apparatus according to claim 22 wherein said local CPE includes means for receiving at least one ring tone from at least one of a central office (CO) switch, a voice over Internet protocol (VoIP) server, and an Internet service provider (ISP) server prior to taking said local CPE off-hook.

26. The apparatus according to claim 22 wherein said means for broadcasting includes means for transmitting said voice message over a paging channel.

27. The apparatus according to claim 22 wherein said network includes at least one of a VentureNet, a Ethernet, a "blue tooth" network, a X.10 network, a personal computer (PC) network, and a wireless network.

28. The apparatus according to claim 22 further comprising said at least one remote CPE including means for delivering said voice message to a speaker.

29. The apparatus according to claim 22 further comprising means for said local CPE to deliver said voice message to a speaker.

30. The apparatus according to claim 22 further comprising the means for storing said voice message at said remote CPE.

31. The apparatus according to claim 22 wherein said voice message is a call announce identification message.

32. The apparatus according to claim 31 wherein said call announce identification message is generated by at least one of a central office (CO) switch, a voice over Internet protocol (VoIP) server, and an Internet service provider (ISP) server.

33. The apparatus according to claim 23 further comprising means for receiving a data message instructing said local CPE to go off-hook prior to said local CPE going off-hook.

34. An apparatus for broadcasting incoming call information from a local customer premises equipment ("CPE") to at least one remote CPE, said apparatus comprising:

means for receiving incoming call information including caller data at said local CPE, wherein said incoming caller data is received as at least a portion of a frequency shift keying ("FSK") signal;

means for deriving call information from said received incoming call information, wherein said derived call information includes said incoming call information, and means for broadcasting said derived call information over a communications network to said at least one remote CPE, wherein said remote CPE comprises means for determining a corresponding voice message as a function of at least a portion of said caller data by parsing a number field derived from said FSK signal, and selecting sounds corresponding to said parsed number field.

35. An apparatus for broadcasting incoming call information from a local customer premises equipment ("CPE") to at least one remote CPE, said apparatus comprising:

means for receiving incoming call information including caller data at said local CPE, wherein said incoming caller data is received as at least a portion of a frequency shift keying ("FSK") signal;

means for deriving call information from said received incoming call information, wherein said derived call information includes said incoming call information, and means for broadcasting said derived call information over a communications network to said at least one remote CPE, wherein said remote CPE comprises means for determining a corresponding voice message as a function of at least a portion of said caller data by matching data derived from said FSK signal to associated voice tags.

36. The apparatus according to claim 35 further comprising said at least one remote CPE including means for delivering said voice tag to a speaker device.

37. The method according to claim 35 further comprising said at least one remote CPE including means for storing said voice tag.

38. An apparatus for broadcasting incoming call information from a local customer premises equipment ("CPE") to at least one remote CPE, said apparatus comprising:

means for receiving incoming call information including caller data at said local CPE;

means for deriving call information from said received incoming call information, wherein said derived call information includes said incoming call information, and means for broadcasting said derived call information over a communications network to said at least one remote CPE, wherein said remote CPE comprises means for determining a corresponding voice message as a function of at least a portion of said caller data and means for delivering said voice message to a speaker, and wherein said network includes at least one of a VentureNet, a Ethernet, a "blue tooth" network, a X.10 network, a personal computer (PC) network, and a wireless network.

39. An apparatus for broadcasting incoming call information from a local customer premises equipment ("CPE") to at least one remote CPE, said apparatus comprising:

means for receiving incoming call information at said local CPE;

means for deriving call information from said received incoming call information, wherein said means for deriving call information comprises means for determining a corresponding voice message as a function of at least a portion of said incoming caller information by parsing a number field derived from a frequency shift keying ("FSK") signal, and selecting sounds corresponding to said parsed number field, and means for broadcasting said derived call information over a communications network to said at least one remote CPE.

40. The apparatus according to claim 39 further comprising said at least one remote CPE including means for delivering said sounds corresponding to said parsed number field to a speaker.

41. The apparatus according to claim 39 further comprising said at least one remote CPE including means for storing said sounds corresponding to said parsed number field.

* * * * *